3,252,817
STABILIZATION OF SYNTHETIC PLASTICS BASED ON CELLULOSE ESTERS
Wolfram Neumann, Leverkusen, Hans Holtschmidt, Cologne-Stammheim, Otto Bayer, Leverkusen, and Heinz Gläsner and Wilhelm Röhm, Dormagen, Germany, assignors to Farbenfabriken Bayer Aktiengesellschaft, Leverkusen, Germany, a German corporation
No Drawing. Filed Dec. 4, 1962, Ser. No. 242,081
Claims priority, application Germany, Dec. 22, 1961,
F 35,627
6 Claims. (Cl. 106—169)

This invention relates to synthetic plastics based on cellulose esters stabilized against hydrolysis and aging and more particularly to cellulose ester compositions stabilized against the bad odour connected with the occurrence of minimum quantities of free acids.

A considerable number of processes have become known for stabilizing cellulose esters against, for example, light, weather or heat influences, such as the use of resorcinol monobenzoate, hydroquinone salicylate, copper salts of 2,5-dihydroxyterephthalic acid, etc.

It is certainly known that cellulose or cellulose derivatives which still contain free hydroxyl groups can be reacted with carbodiimides in the presence of catalytic quantities of copper salts to isourea ethers. It is known to react alkali cellulose with carbodiimides, with formation of isourea ethers. In these processes, basic groups are formed in the cellulose by the reaction with the carbodiimides and these groups lead to an improvement of for example the colouring capacity.

It has been heretofore known to use carbodiimides having stabilizers against the hydrolytic decomposition of polyesters. It has not been known heretofore, however, that the stabilizing effect of carbodiimides against hydrolysis would be effective in cellulose ester compositions to such an extent that even the bad smell of very small amounts of free acids can practically be removed.

It is therefore an object of this invention to provide cellulose ester compositions stabilized against hydrolysis and aging. It is another object to provide stabilized synthetic plastics based on cellulose esters which are free of the bad smell normally inherent with these cellulose esters because of small amounts of free acid being present in the cellulose ester composition. A further object of this invention is to stabilize cellulose ester compositions against the appearance of free acids even at high temperatures. It is still another object of this invention to provide for cellulose ester compositions remaining unchanged under the influence of heat, light and weather.

The foregoing objects and others are accomplished in accordance with this invention, generally speaking by providing a method for stabilizing synthetic plastics based on cellulose esters by adding to the cellulose ester a carbodiimide as a hydrolysis and aging stabilizer therefor. The invention further contemplates a cellulose ester composition being stabilized against hydrolytic degradation by the presence of a carbodiimide within the composition.

The present invention is concerned with the use of carbodiimides as stabilizers for cellulose ester synthetic plastics and is distinguished in principle from the known processes for stabilizing cellulose esters by the fact that there is no reaction of the cellulose esters with the carbodiimides to isourea ethers. As regards the stabilization of cellulose ester synthetic plastic compositions, it is just a feature forming the basis of the invention that the carbodiimides are present in substantially unchanged form in the synthetic plastic and develop their effect only under the influence of heat, light and weather. This is also shown from the fact that no stabilizing action occurs in the case where the carbodiimides are reacted with the cellulose by the known methods. Moreover, it is superfluous to add catalysts of the aforementioned type when using the carbodiimides as stabilizers. It is therefore a question here of an entirely different action of the carbodiimides with the cellulose ester plastics.

Cellulose esters can still contain small proportions of free acid from the production; on the other hand, under weather influences and under heat stressing, they can for example also split-off free acids such as acetic acid, propionic acid, butyric acid. This degradation of the cellulose esters is made apparent by discolouration of the products and a falling off of the physical properties such as reduction in viscosity, embrittlement, etc. Furthermore, the free acids frequently impart to the plastic articles an extremely unpleasant odour and can in their turn likewise promote a further degradation of the cellulose esters.

In contrast to these influences and the disadvantages arising therefrom, carbodiimides are proved to be excellent stabilizers of the cellulose ester plastics. Not only do they improve the resistivity to heat, light and weather influences, but they also eliminate the unpleasant odour frequently adhering to the cellulose ester plastics.

Suitable stabilizers within the terms of the present invention are quite generally aliphatic, cycloaliphatic or aromatic monocarbodiimides or polycarbodiimides.

The following are to be mentioned as examples of monocarbodiimides:

N,N'-diisopropylcarbodiimide,
N,N'-dibutylcarbodiimide,
N,N'-diallylcarbodiimide,
N,N'-dioctylcarbodiimide,
N,N'-dicyclopentylcarbodiimide,
N,N'-dicyclohexylcarbodiimide,
N,N'-dicycloheptylcarbodiimide,
N,N'-dicyclooctylcarbodiimide,
N,N'-dibornylcarbodiimide,
Diphenylcarbodiimide,
Di-p-tolylcarbodiimide,
Di-p-bromophenylcarbodiimide,
Di-p-carbethoxyphenylcarbodiimide,
Di-p-diethylaminophenylcarbodiimide,
Di-α-naphthylcarbodiimide,
Di-β-naphthylcarbodiimide,
Di-α-pyridylcarbodiimide,
N-methyl-N'-tert.-butylcarbodiimide,
N-hexyl-N'-isopropylcarbodiimide,
N-allyl-N'-oleylcarbodiimide,
N-allyl-N'-cyclohexylcarbodiimide,
N-tert.-butyl-N'-cyclohexylcarbodiimide,
N-tert.-butyl-N'-furfurylcarbodiimide,
N-propyl-N'-phenylcarbodiimide,
N-isopropyl-N'-3-chlorophenylcarbodiimide,
N-phenyl-N'-benzylcarbodiimide,
N-isopropyl-N'-naphthylcarbodiimide,
N-phenyl-N'-p-tolylcarbodiimide,
N-phenyl-N'-tritylcarbodiimide.

Furthermore, derivatives of diphenyl carbodiimide which are substituted on the aromatic radicals have proved to be effective, particularly as regards the removal of extremely small traces of free acids and thus the production of completely odourless cellulose ester plastics and distinguished by their low vapour pressure and their physiological unobjectionability, which derivatives can for example be prepared according to French patent specification 1,293,252 from aromatic monoisocyanates, which carry one or two aryl, alkyl, aralkyl, or alkoxy-substituents in the o-position to the NCO— group, at least one of the substituents comprising at least two carbon atoms, under the action of for example tertiary amines or basically reacting metal compounds. Such carbodiimides are for example the 2,2'-diethyl-diphenylcarbodiimide,
2,2'-diisopropyl-diphenylcarbodiimide,
2,2'-diethoxy-diphenylcarbodiimide,
2,2'6,6'-tetraethyl-diphenyl-carbodiimide,
2,2',6,6'-tetraisopropyl-diphenyl-carbodiimide,
2,2',6,6'-tetra-sec. butyl-diphenyl-carbodiimide,
2,2',6,6'-tetraethyl-3,3'-dichloro-diphenylcarbodiimide.

Polycarbodiimides such as tetramethylene-ω,ω'-bis-tert.-butylcarbodiimide, hexamethylene - ω,ω' - bis-tert. butyl-carbodiimide, hexamethylene - ω,ω' - bis - cyclohexyl-carbodiimide are also suitable, as well as those polycarbodiimides which can for example also be produced according to the process of the aforementioned French patent specification from aromatic diisocyanates and polyisocyanates, such as polycarbodiimides from 1,3,5-triethylbenzene - 2,4 - diisocyanate or 1,3,5-triisopropylbenzene-2,4-diisocyanate.

It is obvious that mixtures of carbodiimides can also be employed.

For the process according to the invention, it is advantageous to use those carbodiimides which can be characterised by the following formula:

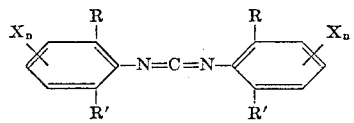

in which R stands for like or different alkyl, alkoxy, aryl radicals, more especially lower alkyl groups such as methyl, ethyl, propyl, isopropyl, butyl, isobutyl, R' can stand for R or additionally halogen, such as chlorine or bromine or nitro-radicals. X can stand for any desired inert radical, such as the above R or R', or nitrilo, carbmethoxy, carbethoxy, dialkylamino groups or the like and $n$ for an itneger from 0 to 3.

The cellulose ester plastics to be stabilized, as which there are to be mentioned by way of example cellulose acetate, cellulose propionate, cellulose butyrate, cellulose acetopropionate, cellulose acetobutyrate (see for example, Ullmann, "Encyklopädie der technischen Chemie," 3rd edition, vol. 5, pages 182 to 201), can contain the carbodiimide component in for example quantities of 0.1–5% by weight and advantageously 0.5–2% by weight. It is possible but unnecessary in normal cases to employ more, e.g., up to 10% by weight of carbodiimide.

It is possible to proceed in such a way that the carbodiimides are admixed in solid or dissolved form with the cellulose esters, for example, in combination with other added substances, such as plasticizers, e.g.:

Phthalates, sebacates, adipates, phosphates, citrates, etc., or also together with antioxidants, ultraviolet absorbers, dyestuffs, pigments, fillers, etc. The carbodiimides can be applied equally well in suitable solvents which can themselves be solvents or non-solvents of the cellulose esters.

The processing of the crude composition containing the carbodiimides can be effected for example in a manner known per se by gelatination to granulated material or, when producing foils, by casting the solution and, in the production of fluidised sintering powder, in certain circumstances by screening the crude compositions.

The further processing of the granulated material can be carried out in the usual way on injection moulding machines on worm presses.

The stabilising action of the carbodiimides against strong heat stressing, for example during the injection moulding process which is carried out at temperatures between 180 and 240° C., is shown by the practically constant or only slightly decreasing viscosity of the cellulose esters. Since the drop in viscosity of the cellulose esters stabilized in this way is smaller per processing step, it is readily possible for the return material to be processed more frequently for the production of injection-moulded elements with good mechanical properties. Even after exposure for a long period in a "Xenotest" apparatus, the products stabilized with carbodiimide show no strong degradation phenomena, such as shown by a discolouration and embrittlement. In addition to the foregoing advantages, the carbodiimides, particularly the alkyl-substituted derivatives of diphenyl carbodiimide preferably used in accordance with some embodiments, have the capacity of removing even minimum quantities of free acids, more especially butyric acid, so that it is possible to produce cellulose derivatives containing butyric acid ester groups so as to be completely odourless.

This property is, for example, proved to be particularly valuable in connection with moulded elements which are exposed during use to high thermal stressing. Moreover, cellulose acetobutyrate-plastic compositions stabilized in this way can now be employed for those every day articles with which formerly the unpleasant natural odour made employment thereof impossible.

Products produced by this process can be employed for all known purposes for which cellulose ester plastics are used, for example, as thermoplastic plastics in the electrical industry, the toy industry, for the production of household articles, foils, plates, profiled elements, tubes, etc.

Example 1

A cellulose acetobutyrate injection moulding composition was prepared with addition of 10% of the aforementioned plasticising agents. In a second series of experiments, the same cellulose acetobutyrate injection moulding composition was prepared, but 1% by weight of 2,2',6,6'-tetraisopropyldiphenylcarbodiimide, based on the total weight, was added to the plasticiser mixture before incorporation thereof. In order to obtain a solution of the carbodiimide in the plasticiser mixture, the latter was heated to 40° C. From the two cellulose acetobutyrate compositions, injection-moulded components were produced, the parts consisting of normal cellulose acetobutyrate composition smelling of butyric acid, while the components which were produced from cellulose acetobutyrate composition with addition of 2,2',6,6'-tetraisopropyldiphenylcarbodiimide were odourless.

From both compositions, standard small rods were produced for testing the mechanical strength and the resistance to heat and weather influences. The heat stability of the compositions was determined from the decrease in viscosity of the test rods injection-moulded between 170 and 240° C. Whereas the viscosity at the high processing temperature fell from 100 to 75 with the normal cellulose acetobutyrate-composition, the stabilized injection moulding composition showed a smaller decrease in viscosity from 100 to 92.

The following table indicates the test results of a short period weathering carried out by exposure to light in a Xenotest exposure apparatus, the test rods being in fact tested for weathering after 500 and 1000 hours.

The table shows that a substantial resistance to weathering was obtained by the addition of 2,2',6,6'-tetraisopropyldiphenylcarbodiimide.

|  | Without exposure to light | | | 500 hours Xenotest | | | 1,000 hours Xenotest | | |
| --- | --- | --- | --- | --- | --- | --- | --- | --- | --- |
|  | Viscosity | Notch impact toughness | Impact toughness | Viscosity | Notch impact toughness | Impact toughness | Viscosity | Notch impact toughness | Impact toughness |
| Specimens without carbodiimide. | 100 | 100 | Not broken | 80 | 5 | 90% broken | 48 | 2 | 100% broken. |
| Specimens with carbodiimide. | 100 | 100 | ___do___ | 93 | 44 | Not broken | 80 | 20 | 70% broken. |

Example 2

A cellulose acetate injection moulding composition was prepared from a cellulose acetate with 56% of acetic acid and plasticizer. Before incorporation the plasticizer, the mixture was divided and 1% of 2,2',6,6'-tetraisopropyldiphenylcarbodiimide was added to one-half, the carbodiimide being dissolved in the plasticizer at 40° C.

Both samples of cellulose acetate were processed on an injection moulding machine to provide small standard rods at temperatures between 190 and 240° C. The thermostability of the injection-moulded elements was then checked on the basis of the viscosity and it was found that the viscosity of the standard cellulose acetate composition already decreased considerably more on granulation than the stabilized composition. The greater decrease in viscosity and thus the less satisfactory heat stability is further shown in the processing. The corresponding values are set-out in the following table.

|  | Viscosity of initial material | Viscosity of the granulated material | Viscosity of injection-moulded components | |
| --- | --- | --- | --- | --- |
|  |  |  | Produced at 190° C. | Produced at 240° C. |
| Cellulose acetate without Carbodiimide | 100 | 87 | 80 | 67 |
| Cellulose acetate with Carbodiimide | 100 | 93 | 87 | 80 |

Example 3

Varying quantities of 2,2',6,6'-tetraethyl-4,4'-dimethyldiphenyl carbodiimide were dissolved in trichlorethylene, sprayed onto a cellulose acetobutyrate composition mixed with plasicizer and the said composition was granulated in the usual way after the trichlorethylene had evaporated. The granulated material was thereafter processed into injection-moulded components and it was found that the said components with increasing addition of carbodiimide showed less suggestion of butyric acid odour and in fact a weak butyric acid odour could be detected with an addition below 1%, whereas it disappeared with an addition of 1% and more.

Example 4

In the production of a cellulose acetobutyrate injection moulding composition, 1% of 2,2',6,6'-tetraethyl-diphenyl carbodiimide was also added to one part of said composition and 1% of polycarbodiimide of 1,3,5,-triisopropylbenzene-2,4-diisobyanate was added to another part, the carbodiimides having been dissolved in plasicizers. The three different mixtures, which only differ from one another by their carbodiimide content were in each case coloured with brown iron oxide and granulated. The separate granulates were injected at temperatures between 170 and 240° C. into an injection moulding machine. It was found that by adding the carbodiimide, the butyric acid odour which was clearly noticeable in the comparison composition without carbodiimides disappeared. It was moreover found that the heat stability was improved by the addition of the carbodiimides, as is apparent from the following figures. The viscosity in the comparison sample without carbodiimide fell from 100 to 79 on being processed between 190 and 240°, from 100 to 98 with the material having 2,2',6,6'-tetraethyldiphenylcarbodiimide and also from 100 to 98 with the product having polycarbodiimide of 1,3,5-triisopropylbenzene-2,4-diisocyanate.

The polycarbodiimide of 1,3,5-triisopropyl-benzene-2,4-diisocyanate was obtained in the following way: 100 parts by weight of 1,3,5-triisopropylbenzene-2,4-diisocyanate are heated with 1 part by weight of 35% sodium methylate in methanol for 3 hours to 180–200° C. The reaction product is taken up in petroleum ether, filtered and the solvent is removed in vacuo.

Example 5

In order to show the temperature-stabilizing action of carbodiimide, a cellulose acetobutyrate composition was stabilized by addition of 1% of 2,2',6,6'-tetraethyldiphenylcarbodiimide.

From the normal and the stabilized cellulose acetobutyrate compositions, both of which originated from the same batch, injection-moulded components were produced under identical conditions, the components were comminuted and re-processed. After repeated processing, the components consisting of normal cellulose acetobutyrate injection moulding composition showed a deterioration in viscosity of 20%, whereas the injection moulded compartments of the stabilzed cellulose acetobutyrate composition processed under the same way only showed a decrease in viscosity of 11%.

In addition, it must be pointed out that the cellulose acetobutyrate composition stabilized with carbodiimide still did not have any butyric acid odour after being processed twelve times.

Example 6

In connection with the covering of aluminium foil with cellulose acetobutyrate composition for the processing to ornamental strips, the butyric acid odour occurring with these strips is disturbing, for example when the said strips are used for kitchen furniture.

Accordingly, a cellulose acetobutyrate composition was prepared which was stabilized with 1% of N-(n-hexadecyl)-N'-(tert.-butyl)-carbodiimide and was coloured with 0.03% of transparent red iron oxide. The ornamental strips covered with this cellulose acetobutyrate composition did not have any butyric acid odour.

A comparable result is obtained if the aforementioned carbodiimide is replaced by an equivalent quantity of N,N'-dicyclohexylcarbodiimide or N,N'-di-p-carbodiimide.

Example 7

1% of 2,2′,6,6′-tetraisopropyl-diphenylcarbodiimide was added to a fluidized sinter powder based on cellulose acetobutyrate composition with plasticizer. The carbodiimide was dissolved in diethylether and was sprayed onto the fluidized sinter powder. After evaporating the ether, coatings were produced on aluminium sheets with a thickness of 3 mm. from the stabilized cellulose acetobutyrate powder and compared with the normal cellulose acetobutyrate powder of the same batch, the said sheets being heated to temperatures between 320° and 420° C.

All coatings of the stabilized cellulose acetobutyrate powder were free from butyric acid odour, whereas the butyric acid odour could be clearly detected in the comparison samples. Furthermore, the addition of the carbodiimide resulted in the decrease in viscosity at the high processing temperature being reduced, as will be seen from the following table:

|  | Viscosity without Carbodiimide | Viscosity with Carbodiimide |
|---|---|---|
| Fluidized sinter powder | 100 | 100 |
| Coating produced at— |  |  |
| 320° C | 81 | 91 |
| 350° C | 73 | 83 |
| 380° C | 73 | 81 |
| 420° C | 67 | 73 |

The stabilization of the cellulose acetobutyrate sinter powder thus permits higher processing temperatures, which in turn lead to more homogeneous and smoother coatings with a particularly good adhesion since the adhesion increased with the processing temperature.

Example 8

The addition of carbodiimides is also effective in connection with the production of foils for raising the resistance to temperature and the resistance to ageing. For example, 17 parts of cellulose acetobutyrate are dissolved in 73 parts by weight of methylene chloride. This solution is divided and 1% of 2,2′,6,6′-tetraisopropyl-diphenyl-carbodiimide is added to the first half. Casting foils with a thickness of 100μ are produced from both solutions. It is found that the resistance to ultraviolet of the cellulose acetobutyrate foil is improved by the addition of carbodiimide, as will be seen from the following table. For the test, the foils are exposed to the light of a quartz lamp at a distance of 0.5 m.

|  | Without light exposure | | After 15 hours with quartz lamp | |
|---|---|---|---|---|
|  | Breaking strength | Breaking elongation | Breaking strength | Breaking elongation |
| Foils without Carbodiimide | 100 | 100 | 58 | 13 |
| Foils with Carbodiimide | 100 | 100 | 70 | 20 |

Example 9

A batch of cellulose acetobutyrate powder was divided into three parts, with which the following additives were admixed:

Part 1:
 10% of plasticizer
 1% of green chromium oxide

Part 2:
 10% of plasticizer
 1% of green chromium oxide
 1% of N,N′-diisopropylcarbodiimide Part 3:
 10% of plasticizer
 1% of green chromium oxide
 1% of N-n-dodecyl-N′(tert.-butyl)-carbodiimide.

These three products were granulated on a roller and thereafter moulded at temperatures from 170 to 270° C. to form small sheets, the viscosities of which were measured. The results are set out in the following table:

|  | Viscosity of granulate | Viscosity of injection-moulded components | |
|---|---|---|---|
|  |  | Produced at 170° | Produced at 240° |
| Cellulose acetobutyrate without Carbodiimide | 100 | 94 | 80 |
| Cellulose acetobutyrate with N,N′-Diisopropyl-carbodiimide | 100 | 98 | 96 |
| Cellulose acetobutyrate with N-n-Dodecyl-N′-(tert.-butyl)-carbodiimide | 100 | 98 | 94 |

It is to be seen that the addition of N,N′-diisopropylcarbodiimide and N-n-dodecyl-N′-(tert.-butyl)-carbodiimide resulted in a reduction in the falling off of viscosity, i.e., the thermostability was improved. The butyric acid odour, which could be detected with the first part of the mixture, has completely disappeared in parts 2 and 3, which contain the said carbodiimides.

It is to be understood that instead of the cellulose esters described in the foregoing examples any cellulose ester composition, for instance all those compositions described in Ullmann, "Encyklopädie der technischen Chemie," 3rd Edition, vol. 5, pages 182 to 201, can be stabilized by the indicated carbodiimides.

Although the invention has been described in considerable detail in the foregoing for the purpose of illustration, it is to be understood that such detail is solely for this purpose and that variations can be made therein by those skilled in the art without departing from the spirit and scope of the invention except as it is said further in the claims.

We claim:
1. The method of stabilizing a synthetic plastic based on a cellulose ester selected from the group consisting of cellulose acetate, cellulose propionate, cellulose butyrate, cellulose acetopropionate and cellulose acetobutyrate, against hydrolysis and ageing which comprises adding to said plastic from 0.1 to 10% by weight of a carbodiimide.

2. The method of claim 1 wherein said carbodiimide is selected from the group consisting 2,2′,6,6′-tetraisopropyldiphenylcarbodiimide,
 2,2′,6,6′-tetraethyl-4,4′-dimethyldiphenylcarbodiimide,
 2,2′,6,6′-tetraethyldiphenylcarbodiimide,
 the polycarbodiimide of 1,3,5-triisopropylbenzene-2,4-diisocyanate,
 N-(n-hexadecyl)-N′-(tert.-butyl)-carbodiimide,
 N,N′-dicyclohexylcarbodiimide,
 N,N′-di-p-tolyl-carbodiimide,
 N,N′-diisopropylcarbodiimide,
 N,n-dodecyl-N′-(tert.-butyl)-carbodiimide.

3. The method of claim 1 wherein said carbodiimide is an alkyl-substituted diphenylcarbodiimide.

4. A hydrolysis and age-stabilized composition consisting essentially of a synthetic plastic based on a cellulose ester selected from the group consisting of cellulose acetate, cellulose propionate, cellulose butyrate, cellulose acetopropionate and cellulose acetobutyrate, and from about 0.1 to about 10% by weight of a carbodiimide.

5. The composition of claim 4 wherein said carbodiimide is selected from the group consisting of 2,2′,6,6′-tetraisopropyldiphenylcarbodiimide,
2,2′,6,6′-tetraethyl-4,4′-dimethyldiphenylcarbodiimide,
2,2′,6,6′-tetraethyldiphenylcarbodiimide,
the polycarbodiimide of 1,3,5-triisopropylbenzene-2,4-diisocyanate,
N-(n-hexadecyl)-N′-(tert.-butyl)-carbodiimide,
N,N′-dicyclohexylcarbodiimide,
N,N′-di-p-tolyl-carbodiimide,
N,N′-diisopropylcarbodiimide,
N-n-dodecyl-N′-(tert.-butyl)-carbodiimide.

6. The composition of claim 4 wherein said carbodiimide is an alkyl-substituted diphenylcarbodiimide.

References Cited by the Examiner

UNITED STATES PATENTS

| | | | |
|---|---|---|---|
| 2,654,680 | 10/1953 | Goppel et al. | 260—45.9 |
| 3,072,602 | 1/1963 | Clark et al. | 252—300 |

ALEXANDER H. BRODMERKEL, *Primary Examiner.*

D. J. ARNOLD, *Assistant Examiners.*